W. B. HURLBURT.
SELF OILING REAR AXLE.
APPLICATION FILED DEC. 26, 1916.

1,247,276.

Patented Nov. 20, 1917.
2 SHEETS—SHEET 1.

Witnesses
John Darby
H. Muchmore

Inventor
William B. Hurlburt
By his Attorney
Hermann F. Kurtz

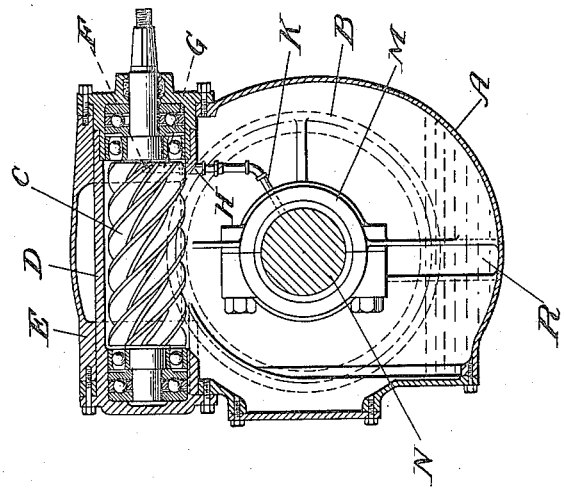
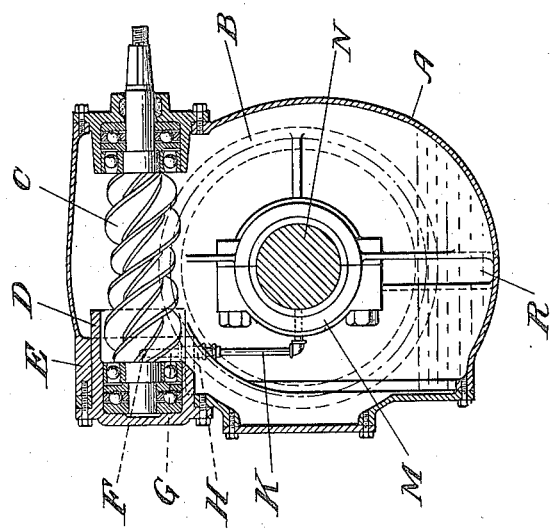

UNITED STATES PATENT OFFICE.

WILLIAM B. HURLBURT, OF NEW YORK, N. Y.

SELF-OILING REAR AXLE.

1,247,276.

Specification of Letters Patent.   Patented Nov. 20, 1917.

Application filed December 26, 1916.   Serial No. 138,751.

*To all whom it may concern:*

Be it known that I, WILLIAM B. HURLBURT, a citizen of the United States, and a resident of New York city, county and State of New York, have invented certain new and useful Improvements in Self-Oiling Rear Axles, of which the following is a specification, reference being had to the drawings herein referred to which are made a part hereof.

This invention relates to a system of improved oiling and involves construction necessary to produce the desired result.

It is in some cases desired to use plain bearings rather than roller bearings or other anti-friction bearings, and with plain bearings, as, for instance, in an axle for an automobile it becomes necessary to supply oil to them, preferably by a continuous or intermittent stream. While a pump would serve this purpose, I have sought to devise a more simple means which will accomplish it with economy and certainty.

To this end I utilize in a worm drive construction, suitable means associated with the worm and gear to force the oil through the system, or other forms of drive and means.

While this may be done in a variety of ways, in a particular embodiment which I have shown in the accompanying drawings:

Fig. 2 is a transverse section at the center of the drive shaft bearings and near the center of the interior parts.

Fig. 3 is a slightly modified form of housing for the worm.

Figure 1:
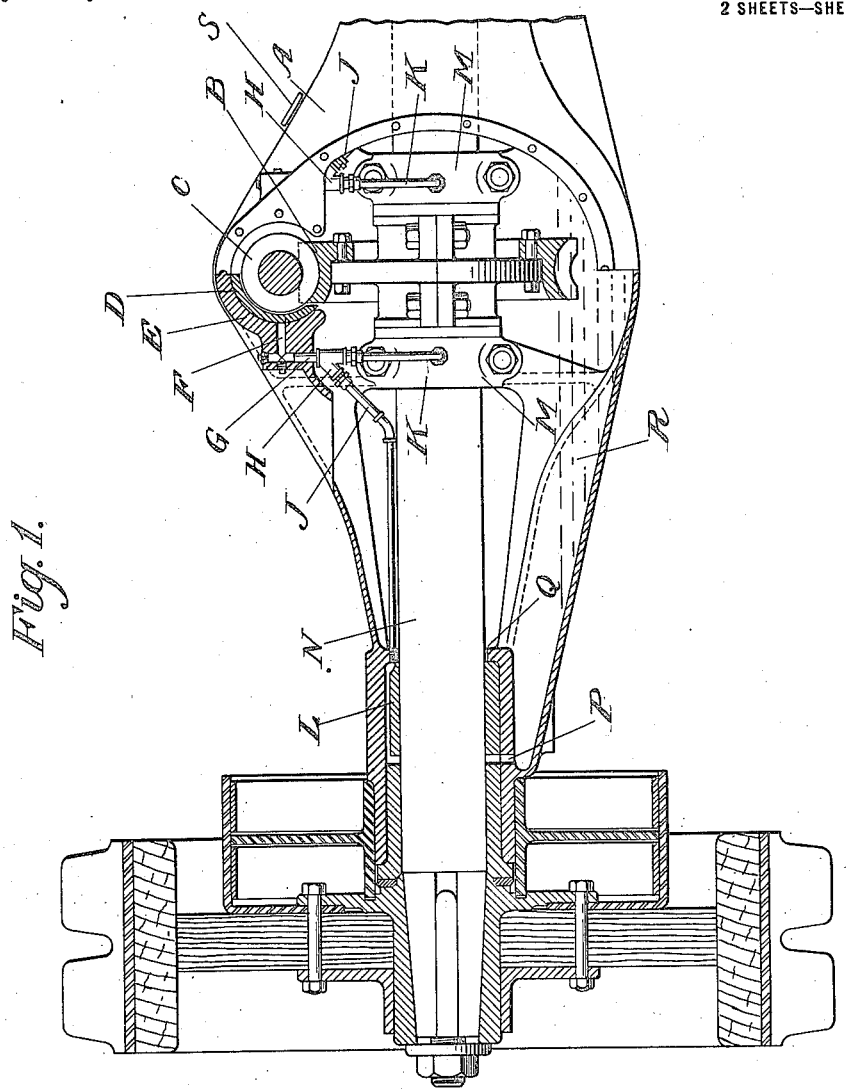
Figure 1 is a longitudinal section of the center and one side of a rear axle.

In the drawings, A is an axle housing, B is the driven gear, C is the driving worm, D is a shell closely fitting the worm, supported in a portion E of the housing. The oil duct F leads from the space in which the worm C is located, through the shell D and support F and joins the duct G, which, at H, is divided by a Siamese joint into the duct J and the duct K. J leads to the outer bearings L, and K leads to the inner bearings M, both of which bearings support the drive shaft N. From the bearing L there is an outlet P, so that oil after flooding the bearing will pass through it, or at the inner end Q, into the sump R of the housing.

The oil accumulates in the sump to a level sufficient for the gear wheel B to dip into it, and in its rotation carries the oil to the upper side where the gear engages the worm C. As shown in Fig. 2, the oil will accumulate at the junction of the gear and the worm and the meshing of the thread of the worm with the teeth of the gear crowds out the oil which accumulates or over-flows at the end of the gear. and being confined by the surrounding shell D, a degree of pressure is created resulting in the exit of the oil through the ducts F, with sufficient force to carry the oil through the system of the pipes or ducts to the bearings.

In the case of a worm shaped to closely fit the gear, this crowding of the oil takes place at the engaging end, that is, where it first reaches the worm. In the case of a straight worm, however, where the contact with the gear teeth is practically only in the middle, the oil will flood the worm when thrown up on the approaching side of the gear and will be carried along by the worm so that the crowding or accumulating of oil will be at the leaving end, that is, where the gear wheel leaves the worm, and in such case, as shown in Fig. 3. The exit ducts arranged at that end and the pressure effected by the crowding, forces the oil out of them and into the oil system of pipes or ducts to the desired bearings.

The shell D may extend the length of the worm or inclose only a portion of one end. It is formed to have a close fit with only a slight clearance about the worm. with a slot on the lower side through which the gear wheel passes, or into which slot the gear wheel fits with a slight clearance on either side. While there will be some leakage of oil through the clearances, the clearance is readily made sufficiently small so as to cause the oil to pass in the desired direction. The momentum of the oil and the centrifugal effect due to the rotation of the gear wheel, all tend to throw the oil into the shell D and produce the crowding which results in the necessary pressure and the forcing of the oil through the system.

The use of my invention means that at stated intervals, such, for instance, as every three months, or under circumstances every six months, a proper amount of oil is inserted through cap S into the housing to give a suitable level, to meet the particular construction involved. The lubrication is thus insured without further attention whatsoever. The regular operation of the driving parts is adequate without any other moving parts, to cause the forcing of the oil, that is the circulating of the necessary supply of oil throughout the system in a proper manner to effect lubrication. The proportioning of the parts, the sizes of the ducts, the clearance and any other dimensions, will naturally vary with the particular construction involved in each design. The speed of the driven gear will likewise be a factor and the shape of the worm. In general the placing of the shell D of a size and in suitable relation to the regular driving element, effects the desired forced lubrication, without the addition of any moving parts and therefore produces a self-oiling axle at a very slight additional cost and without any elements liable to derangement or requiring replacement or repair. The usual level observation means may be used to determine that the level of the oil in the sump is satisfactory, and if through accidental leakage this becomes too low it may be readily supplemented. Being protected from all dust and dirt, it will be readily seen that the duration of the supply of oil, in a satisfactory condition, will depend upon the extent of use and to some extent climatic conditions, but may under circumstances require replenishing or change only at very long intervals such as a year. The problem of proper lubrication is therefore extremely simplified, not alone as to the initial cost, but with respect to cost of operation and attention.

Variations may be made in the mounting of the worms and gears and housing in general, strainers may be embodied, or the number of bearings may be varied, as well as the system of ducts and piping, and numerous other changes may be resorted to without departing from the spirit of my invention, but what I claim and desire to secure by Letters Patent is:

1. The combination with a shaft and a bearing therefor, of a gear for driving said shaft, a housing inclosing said gear and adapted to contain lubricant, a second gear adapted to drive said first mentioned gear, a stationary shell closely confining a portion of the teeth of said second mentioned gear, and a connection from said shell to a bearing of the shaft, whereby the operation of said gears will force lubricant through said connection to said bearing.

2. The combination with a shaft, of a gear for said shaft, a housing inclosing said gear and adapted to contain lubricant, a worm adapted to drive said gear, a stationary shell closely confining a portion of said worm, and a connection from said shell to a bearing of the shaft, whereby the operation of said worm will force lubricant through said connection to said bearing.

3. An axle having a stationary shell, driving shaft in said shell, bearings for said shaft, gears within said shell to drive said shaft, stationary means associated with said gearing to confine a flowing lubricant and ducts for the passage of said lubricant coöperating with said means, whereby the driving of said shaft operates to force the lubricant through said ducts to the bearings.

4. An oiling system for a driving axle, including a housing and a driven shaft, a driven gear on said shaft, a driving member, a stationary casing associated with said driving member to collect and confine flowing oil and an oiling system and connections therewith whereby oil in said housing is raised to said inclosing shell and forced through said oiling system.

5. A driving axle including a housing, a driven shaft, a gear, a driving worm, a shell partly inclosing and closely confining said worm and an oil outlet from the interior of said shell whereby oil is forced by said gear and worm to and through said oil outlet for the purpose described.

6. A self-oiling drive axle comprising an oil reservoir, a drive shaft and bearings, ducts to carry the oil to said bearings, driving gears within the axle housing, stationary means associated with said driving gears to collect and confine flowing oil whereby the movement of the gears forces the oil through the oil ducts.

7. An axle for a vehicle comprising a stationary housing inclosing driving gears, a driven shaft and bearings therefor, means coöperating with the driving gears to collect and confine oil and to force said oil to said bearings and ducts to convey oil to the bearings.

8. An oiling system for driving mechanism, comprising a driven shaft and bearings therefor, oil passages to said bearings, a drive shaft and a gear thereon meshing with a driven gear associated with said driven shaft, a shell closely engaging a portion of said driving gear and coöperating therewith whereby oil carried to the intermeshing of said gears is forced into said shell, and an outlet from said shell connecting with the oiling connection of the shaft bearings.

In testimony whereof, I have signed my name to this specification, in the presence of two subscribing witnesses, this 2nd day of August 1916.

WILLIAM B. HURLBURT.

Witnesses:
GEORGE V. McNALLY,
H. MUCHMORE.